(12) United States Patent
Scott

(10) Patent No.: US 9,446,867 B2
(45) Date of Patent: Sep. 20, 2016

(54) METHOD FOR RADIAL FLUID FLOW PARTICLE FILLING OF RESPIRATOR CANISTERS

(71) Applicant: Philip Stephen Scott, Standish (GB)

(72) Inventor: Philip Stephen Scott, Standish (GB)

(73) Assignee: Scott Health & Safety Limited, Skelmersdale (GB)

( * ) Notice: Subject to any disclaimer, the term of this patent is extended or adjusted under 35 U.S.C. 154(b) by 584 days.

(21) Appl. No.: 13/933,541

(22) Filed: Jul. 2, 2013

(65) Prior Publication Data

US 2013/0292001 A1 Nov. 7, 2013

Related U.S. Application Data

(63) Continuation of application No. PCT/EP2012/050318, filed on Jan. 10, 2012.

(60) Provisional application No. 61/431,295, filed on Jan. 10, 2011.

(51) Int. Cl.
| | |
|---|---|
| *B65B 1/20* | (2006.01) |
| *B65B 1/22* | (2006.01) |
| *A62B 19/00* | (2006.01) |
| *A62B 23/02* | (2006.01) |
| *B01J 20/30* | (2006.01) |
| *B01D 46/00* | (2006.01) |

(52) U.S. Cl.
CPC ............... *B65B 1/22* (2013.01); *A62B 19/00* (2013.01); *A62B 23/02* (2013.01); *B01J 20/3092* (2013.01); *B01D 46/0001* (2013.01); *B01D 2259/4541* (2013.01)

(58) Field of Classification Search
CPC .............................. B01D 46/0001; B65B 1/22

USPC ................................................ 141/12, 71, 73
See application file for complete search history.

(56) References Cited

U.S. PATENT DOCUMENTS

| | | | |
|---|---|---|---|
| 5,620,507 A | 4/1997 | Oborne et al. | |
| 6,146,449 A * | 11/2000 | Lee ................... | B01D 46/0001 128/206.17 |
| 6,408,894 B1 * | 6/2002 | Davankov ............. | B01D 15/00 141/12 |
| 2006/0196157 A1 | 9/2006 | Greer et al. | |

FOREIGN PATENT DOCUMENTS

| | | |
|---|---|---|
| CN | 1208667 A | 2/1999 |
| CN | 1098790 C | 1/2003 |
| CN | 1759036 A | 4/2006 |
| GB | 1237153 A | 6/1971 |
| KR | 10-0951392 B1 | 3/2010 |
| WO | 03090872 A1 | 11/2003 |

* cited by examiner

*Primary Examiner* — Jason K Niesz
(74) *Attorney, Agent, or Firm* — Wyatt B. Pratt

(57) ABSTRACT

Methods are disclosed for filling a filter cartridge canister. Flow through an exit plenum and a filter screen of the canister is initially blocked, a sorbent inlet of the canister is open, and a ring of the canister is open. Flow is then initiated through the inlet and ring so sorbent particles and fluid flow into the canister. A pressure differential is provided between the inlet and the ring to enhance filling. The exit plenum is opened to impart an even fluid flow across a sorbent stratum. Flow through the ring is stopped, and sorbent particles continue to be added via the inlet until the cavity is filled. The filter screen is then compressed, the sorbent inlet is sealed and the filter screen is fixed to a compressed position while flow is maintained through the exit plenum.

20 Claims, 2 Drawing Sheets

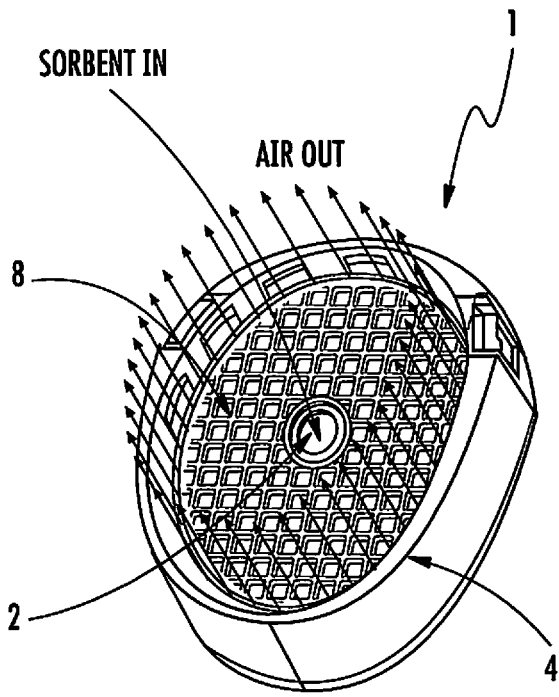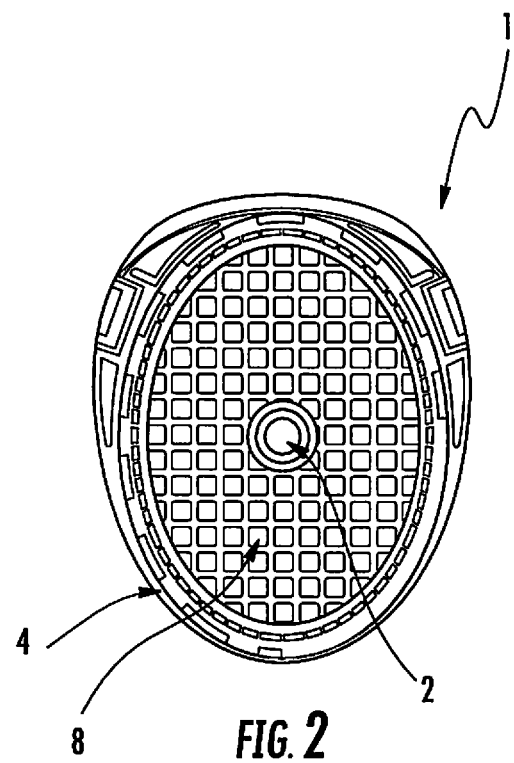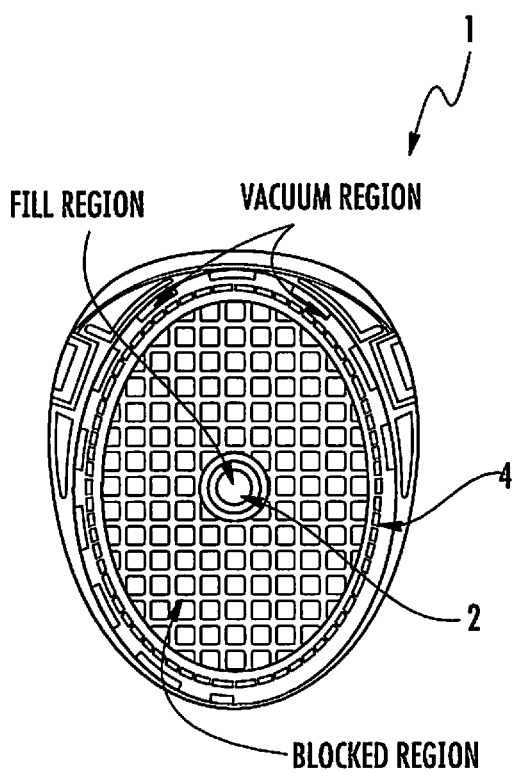

METHOD FOR RADIAL FLUID FLOW PARTICLE FILLING OF RESPIRATOR CANISTERS

CROSS-REFERENCE TO RELATED APPLICATIONS

This application is a continuation of International Patent Application No. PCT/EP2012/050318 filed Jan. 10, 2012, which claims the benefit of U.S. Provisional Patent Application No. 61/431,295 filed Jan. 10, 2011, the contents of both of which are incorporated by reference herein.

FIELD OF THE DISCLOSURE

The invention is generally related to air purification systems and methods, and more particularly to improved systems and methods for filling air purification system canisters.

BACKGROUND OF THE DISCLOSURE

Respiratory canisters and associated filling methods are known. Such respiratory canisters are often used for providing air purification of contaminated environments to protect workers, first responders, and warfighters. Air purification of vapors and gases is effected by activated materials, typically granular activated carbon, crystalline materials such as zeolites, metal oxides, or metallic organic frameworks, silica gel, and molecular sieves. These activated materials or "sorbents" must be contained in a cavity within the canister through which the contaminated air is passed. Granular sorbent particulate matter is a homogeneous material of defined unit volume within which exist multi-modal distributions of particles with varying physical properties, such as diameter, surface area, hardness, and particle density.

The filling of the canister cavity determines the effective utilization of the sorbent material contained therein. It is desirable to use the least sorbent material possible in order to minimize the size, weight, breathing resistance and commercial cost of the canister.

Traditional two-axis vibrational filling techniques impart fractional gravitational forces to maximize the effective packed bed density of the resultant bed while preventing full vibrofluidization of the sorbent bed during filling. The use of vibration imparts force on the particle through the sorbent bed walls and nearest neighbor sorbent particles. Empirical evidence demonstrates for these techniques that vibrational acceleration in the horizontal direction of about 0.48 g and vibration acceleration in a vertical direction of about 0.45 g achieves a desired packing density.

Techniques such as these are suboptimal in that the target packing density is in reference to that achieved with a snowstorm or raining technique that is less than the theoretical maximum achievable packing density based on the mean diameter, sphericity, and particle diameter of the sorbent. Furthermore the vibrational force impacted onto the particles is dampened in stages, from the controlled force, by the nearest neighbor particles and resultant partial sorbent bed. In the first stage of this filling technique the particles contact directly with the sorbent bed exit screen. As stable packing density is achieved by particles, movement is first constrained then ceases in the vertical direction. Similarly, a localized horizontal effect is achieved. This maximizes the forces impacted onto the particles nearest to the sorbent bed exit screen and sidewalls and minimizes the forces nearest to the sorbent introduction point.

To achieve sufficient force to achieve a minimally acceptable density in these regions higher than desired force is impacted onto the sorbent bed exit screen and side wall regions. This produces a classifying effect whereby particles with higher packed density (smaller diameter) are deposited in the higher force regions, while particles with lower packed density (larger diameter) are deposited in the lower force regions. It also imparts sufficient force to crush those particles with insufficient hardness thereby leading to the generation of fine powder. This fine powder prevents even airflow distribution, leads to higher sorbent bed airflow resistance, and can migrate through the packed bed leading to loss of bed integrity following rough handling and generation of fines that may be breathed by a respirator user.

In summary, two axis vibrational filling of a sorbent bed may lead to a desired packing density in the bulk of the entire sorbent volume but may also result in maldistribution of packing density in both axes, with attendant negative effects for targeted respiratory applications. Thus, there is a need for improved packing techniques to minimize or eliminate the aforementioned deficiencies in the current art.

SUMMARY OF THE DISCLOSURE

A method is disclosed for filling a filter cartridge canister, comprising: introducing filter media and fluid to the canister through an opening in a first face of the canister; and allowing the fluid to exit the canister through a plurality of openings spaced about the canister; where allowing the fluid to exit the canister comprises inducing a pressure differential between the opening and the plurality of openings. In some embodiments, the canister is subjected to a vibrational force while introducing the filter media and fluid to the canister. In some embodiments, the step of allowing the fluid to exit the canister comprises applying a vacuum to the plurality of openings. In some embodiments, the vibrational force is oriented parallel to an axis along which said filter media is introduced through said opening. In some embodiments, vibrational force applied non-parallel to the axis is minimized.

A method for filling a filter cartridge canister is disclosed, comprising an initial stage in which flow through an exit plenum screen and a filter screen of the canister is blocked, a sorbent inlet of the canister is open, and a peripheral ring of the canister is open; a fluidization stage in which fluid flow is initiated through the sorbent inlet and ring such that sorbent particles and fluid flow into a cavity of the canister through the sorbent inlet, said flow through the sorbent inlet and ring facilitated by inducing a pressure differential between the sorbent inlet and the peripheral ring; a stratification stage in which the exit plenum is open to impart an even fluid gradient across a sorbent stratum; a stabilization stage in which flow through the peripheral ring is stopped, and sorbent particles continue to be added via the sorbent inlet until the cavity is filled to its entirety with sorbent; and a final stage in which the filter screen is compressed in the direction of the exit plenum, the sorbent inlet is sealed and the filter screen is fixed to a compressed position while flow is maintained through the exit plenum. During the fluidization stage, sorbent volumetric feed rate may set to a controlled rate and a displacement force may be applied. The displacement force may be a vibrational force oriented parallel to an axis along which said fluid flow is introduced through said sorbent inlet.

BRIEF DESCRIPTION OF THE DRAWINGS

By way of example, specific embodiments of the disclosed method will now be described, with reference to the accompanying drawings:

FIG. 1 is an isometric view of an exemplary respirator canister;

FIG. 2 is a top plan view of the canister of FIG. 1;

FIG. 3 is a top plan view of the canister of FIG. 1 illustrating a fill region, vacuum region and blocked regions of the canister during filling operations.

DETAILED DESCRIPTION

Figure 4:
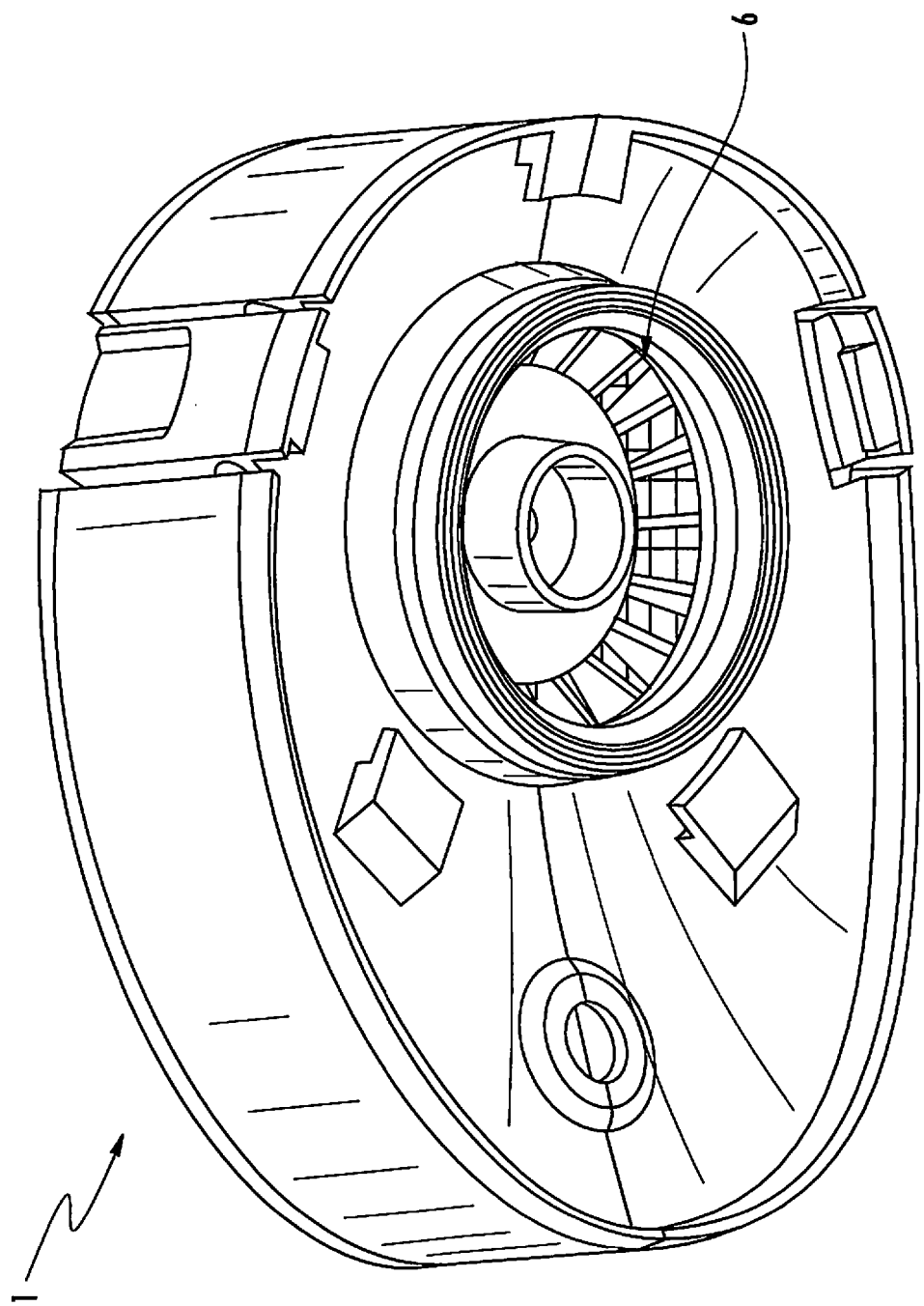
FIG. 4 is a reverse isometric view of the canister of FIG. 1.

The method disclosed herein solves the problems with prior techniques by achieving near-maximal packing density through the use of a radial flow of fluid. This flow is introduced through a canister screen annular ring to impart horizontal and vertical force on sorbent particles below the particulate fluidization regime, independent of canister orientation and without horizontal vibrational force. This improves the packed bed density distribution throughout the canister bed leading to uniform airflow, better utilization of the sorbent volume, and a more robust sorbent bed that is less prone to rough handling damage. The method includes a system with three components: sorbent, fluid, canister, and a series of method inputs with defined method outputs.

In one embodiment, the sorbent can be a granular particle material with particle diameter greater than that which would pass through a US number 200 MESH sieve. The sorbent is defined by a nominal packed density, particle density, and sphericity factor. The fluid is either liquid or gas with density and viscosity dependent on temperature and pressure. In the disclosed method, it is desired that the fluid be gas, and more particularly that the fluid be air. The invention, however, is not so limited.

Referring to FIGS. 1-3, the canister 1 includes a cavity into which the sorbent is to be filled. The canister material may be plastic, metal, composite or fibrous sheath. The canister boundaries are defined by the following features: bed hydraulic diameter (may be any of a variety of shapes, such as a circle, ellipse, rectangle, square, star, hexagonal), pre-compression bed depth, bed depth, sorbent inlet hydraulic diameter, ring width, radius of curvature, pre-compression volume, and compression volume. The canister cross section surface may be planar, or it may be curved in one or two axes. The disclosed method is believed to impact higher packed bed density for both types of surfaces as achieved by snowstorm filling and therefore benefits are not limited to only one type of surface.

The method inputs are: sorbent volumetric feed rate, ring fluid flow rate, compression fluid flow rate, canister exit plenum valve, canister sorbent inlet valve, filter screen annulus valve, and displacement force. The expected method outputs are: sorbent bed weight, sorbent bed packed density and sorbent bed porosity.

The sorbent volumetric feed rate is defined as the mass per unit time divided by the sorbent bulk density entering the sorbent inlet 2. The ring fluid flow rate is defined as volume of fluid per unit time exiting the canister ring 4 and may be constant or cyclic. The compression fluid flow rate is defined as volume of fluid per unit time exiting the canister exit plenum 6 (FIG. 4) opposite the direction of sorbent volumetric feed via sorbent inlet 2.

As will be appreciated, aspects of the disclosed method can be accomplished using a variety of fluid flow control devices to provide selective opening/closing of the sorbent inlet 2, canister ring 4, exit plenum 6, and bed screens 8. In some embodiments, one or more of the flow control devices are valves. In other embodiments, one or more of the flow control devices may comprise plates. Other flow control devices may also be used.

In some embodiments, a canister exit plenum valve may be provided to selectively prevent fluid flow from the exit plenum 6, a canister sorbent inlet valve may be provided to selectively prevent fluid and sorbent flow from the sorbent inlet, and a filter screen annulus valve may be provided to selectively prevent fluid flow across the screen boundary 8 between the sorbent inlet 2 and canister ring 4.

The filling method can proceed through multiple stages. During the initial stage the flow through the exit plenum 6 and filter screen 8 is blocked, the sorbent inlet 2 may be open to allow sorbent to be introduced to the canister 1, and the ring 4 is open to fluid flow. The next stage, fluidization, is then initiated. Fluid flow is initiated through the ring 4 and sorbent volumetric feed rate is set to a controlled rate and the displacement force is started. In some embodiments, the displacement force applied to the canister 1 during sorbent filling operations is a vibrational force imparted to the canister body 1 along the axis of the sorbent volumetric feed.

The sorbent particles (and air) flow into the cavity through the sorbent inlet 2 where fluid flow imparted by the ring fluid flow adds velocity to the particles in all axes. Particles that impact the exit plenum screen 6 or screen 8 have force imparted by the displacement force. At this point, the stratification stage begins with the opening of the exit plenum 6 to impart an even fluid gradient across the sorbet bed that is a fixed ratio to the ring fluid flow. The stabilization stage consists of shutting off flow through the ring 4 and filling the cartridge 1 until the cavity is filled to its entirety with sorbent. At this point the compression stage is completed with the displacement force stopped, the screen 8 is compressed in the direction of the exit plenum, the sorbent inlet 2 is sealed and the screen 8 is fixed to a compressed position while flow is maintained through the exit plenum 6. This final stage completes the filling process and constitutes the final respirator canister.

A particular exemplary embodiment of a method for filling a conformal canister will now be described. As will be appreciated, the conformal nature of a conformal canister requires a conformal sorbent bed to best utilize space to enable meeting the required levels of protection within weight and bulk requirements. Conformal sorbent beds filled utilizing traditional snowstorm filling processes lead to uneven compression and flow channeling, which may compromise the protection performance of the canister. Filling methods based solely on vibration can impart damaging force to the sorbent granules and can introduce uneven packing density distribution in the sorbent bed.

Thus, an improved method for filling conformal canister sorbent beds is disclosed. The method maintains a packed density equivalent to that obtained from snowstorm filled planar beds.

Following the insertion of the filter screen 8 during assembly, the disclosed radial fluid flow filling process is performed. Thus, the exit plenum 6 is sealed (using an appropriate valve or other flow control mechanism, as previously discussed) and a sorbent filling fixture (not shown) is engaged with the filter screen 8. The fixture may include an inlet for feeding sorbent material and gas through the sorbent inlet 2, and an annular inlet that seals with the ring 4 on the periphery of the screen 8. Sorbent and air may then be introduced through the sorbent inlet 2 at a controlled rate while air is drawn by vacuum out of the canister through the ring 4. This flow also imparts radial flow to the sorbent material introduced within the filter canister. It will be appreciated that the term "by vacuum" comprises the application of a pressure differential across the sorbent bed and/or cartridge. Concurrent with this process a sinusoidal vertical displacement (i.e., vibration) may be introduced to the filter canister 1. In one embodiment, this vibration may be controlled to minimize horizontal vibration and/or displacement (i.e., vibration in a direction that is not parallel to the inlet flow of air and sorbent through the sorbent inlet 2).

The applied vertical vibration may impart sufficient vertical fluidization force to randomly pack the sorbent within the canister. This process continues until the sorbent bed is filled. A plug may then be placed into the sorbent inlet 2 and, while under vacuum, the screen 8 and plug may be simultaneously compressed to enhance packing of the bed. The plug and screen 8 may then be welded in a final position. The filter may be weighed to verify that the correct amount of sorbent has been loaded into the filter.

What is claimed is:

1. A method for filling a filter cartridge canister, comprising:
    introducing filter media and fluid to the canister through an opening in a first face of the canister; and
    allowing the fluid to exit the canister through a plurality of openings spaced about the periphery of the canister;
    wherein allowing the fluid to exit the canister comprises inducing a pressure differential between the opening and the plurality of openings.

2. The method of claim 1, wherein the canister is subjected to a vibrational force while introducing the filter media and fluid to the canister.

3. The method of claim 2, wherein the vibrational force is oriented parallel to an axis along which said filter media is introduced through said opening.

4. The method of claim 3, comprising minimizing vibrational force applied non-parallel to said axis.

5. The method of claim 2, wherein the vibration force is a sinusoidal vibration force.

6. The method of claim 2, wherein the vibrational force imparts sufficient fluidization force to randomly pack the filter media within the filter cartridge canister.

7. The method of claim 1, further comprising sealing an exit plenum of the filter cartridge canister during the introducing and allowing steps.

8. The method of claim 1, further comprising plugging a sorbent inlet under a vacuum pressure, wherein the vacuum pressure compresses the plug and a filter media bed screen to enhance packing of the filter media in the filter cartridge canister.

9. The method of claim 1, further comprising selectively opening an exit plenum of the filter cartridge canister to impart an even fluid gradient across a sorbet stratum to form a layer of filter media stratum, wherein the even fluid gradient is imparted as a fixed ratio to the ring fluid flow.

10. The method of claim 9, further comprising the step of forming progressive layers of filter media stratum in the filter cartridge canister.

11. A method for filling a filter cartridge canister, comprising:
    an initial stage in which flow through an exit plenum and a filter screen of the canister is blocked, a sorbent inlet of the canister is open, and a peripheral ring of the canister is open;
    a fluidization stage in which fluid flow is initiated through the sorbent inlet and ring such that sorbent particles and gas flow into a cavity of the canister through the sorbent inlet, said flow through the sorbent inlet and ring facilitated by inducing a pressure differential between the sorbent inlet and the peripheral ring;
    a stratification stage in which the exit plenum is open to impart an even fluid gradient across a sorbent stratum;
    a stabilization stage in which flow through the ring is stopped, and sorbent particles continue to be added via the sorbent inlet until the cavity is filled with sorbent; and
    a final stage in which the filter screen is compressed in the direction of the exit plenum, the sorbent inlet is sealed and the filter screen is fixed to a compressed position while flow is maintained through the exit plenum.

12. The method of claim 11, wherein during the stratification stage, progressive layers of sorbent are formed until the cavity is filled with sorbent up to the ring.

13. The method of claim 11, wherein, during the fluidization stage, sorbent volumetric feed rate is set to a controlled rate and a displacement force is applied to the canister.

14. The method of claim 13, wherein the displacement force is a vibrational force oriented parallel to an axis along which said fluid flow is introduced through said sorbent inlet.

15. The method of claim 14, wherein the vibrational force is a sinusoidal vibrational force.

16. The method of claim 14, wherein the vibrational force imparts sufficient fluidization force to randomly pack the filter media within the filter cartridge canister.

17. The method of claim 11, wherein the fluid flow imparted by flow of the gas through the ring adds velocity to the sorbent particles in all axes, and the sorbent particles maintain a fluid nature throughout the canister until a stratum of sorbent is formed at the exit plenum.

18. The method of claim 11, wherein the stratification stage forms progressive layers of filter media stratum.

19. The method of claim 18, wherein the progressive layers of filter media stratum are formed until the filter media substantially fills the filter media cartridge, with a cavity between the sorbent inlet and peripheral ring.

20. The method of claim 11, wherein the final stage serves to compress the filter screen to enhance packing of the sorbent particles in the canister.

* * * * *